(12) United States Patent
Chaudhary et al.

(10) Patent No.: US 9,470,601 B1
(45) Date of Patent: Oct. 18, 2016

(54) LEAK LOCALIZATION IN PIPELINE NETWORK

(71) Applicant: International Business Machines Corporation, Armonk, NY (US)

(72) Inventors: Harsh Chaudhary, Briarcliff Manor, NY (US); Younghun Kim, White Plains, NY (US); Tarun Kumar, Mohegan Lake, NY (US); Abhishek Raman, Santa Clara, CA (US); Rui Zhang, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/009,321

(22) Filed: Jan. 28, 2016

(51) Int. Cl.
G01F 23/00 (2006.01)
G01M 3/28 (2006.01)
G01M 3/00 (2006.01)

(52) U.S. Cl.
CPC ........... *G01M 3/2807* (2013.01); *G01M 3/007* (2013.01)

(58) Field of Classification Search
CPC ................... G01F 1/66; G01M 3/243; G01N 2291/02836
See application file for complete search history.

(56) References Cited

U.S. PATENT DOCUMENTS

| | | | | |
|---|---|---|---|---|
| 4,327,576 A * | 5/1982 | Dickey | ................. | G01M 3/243 73/40.5 A |
| 5,272,646 A * | 12/1993 | Farmer | ............... | G01M 3/2815 340/605 |
| 5,983,948 A * | 11/1999 | Yagi | ...................... | F16L 55/164 138/97 |
| 6,348,869 B1 * | 2/2002 | Ashworth | ............... | F16L 55/44 138/93 |
| 6,912,472 B2 | 6/2005 | Mizushina et al. | | |
| 8,665,101 B2 | 3/2014 | Solomon | | |
| 2002/0134140 A1 | 9/2002 | Baumoel | | |
| 2012/0272722 A1 | 11/2012 | Khalifa et al. | | |
| 2014/0121999 A1 | 5/2014 | Bracken et al. | | |
| 2015/0153743 A1* | 6/2015 | Jarrell | ...................... | F17D 5/00 700/283 |

FOREIGN PATENT DOCUMENTS

WO 2009067770 A1 6/2009

OTHER PUBLICATIONS

List of IBM Patents or Patent Applications Treated as Related; (Appendix P), Filed Apr. 8, 2016; 2 pages.
Harsh Chaudhary et al., "Topological Connectivity and Relative Distances From Temporal Sensor Measurements of Physical Delivery System", U.S. Appl. No. 14/976,820, filed Dec. 21, 2015.
Harsh Chaudhary et al., "Linepack Delay Measurement in Fluid Delivery Pipeline", U.S. Appl. No. 14/976,870, filed Dec. 21, 2015.

(Continued)

*Primary Examiner* — Elias Desta
(74) *Attorney, Agent, or Firm* — Cantor Colburn LLP; David Quinn

(57) ABSTRACT

A method and system to localize a leak in a pipeline network include identifying a respective measured time at which an effect of a leak exhibits in a time-varying data signal measured by each of a plurality of sensors distributed along the pipeline network, each pair of the plurality of sensors defining a respective pipe segment therebetween. Estimating a time of occurrence of the leak based on the measured time associated with two or more of the plurality of sensors; and estimating a relative distance of a leak location from one or more of the plurality of sensors. Determining the leak location is based on the relative distance.

17 Claims, 3 Drawing Sheets

(56) References Cited

OTHER PUBLICATIONS

Tarun Kumar et al., "Detecting Small Leaks in Pipeline Network", U.S. Appl. No. 14/976,960, filed Dec. 21, 2015.
Cataldo et al., "A New Method for Detecting Leaks in Underground Water Pipelines", IEEE Sensors Journal, vol. 12, No. 6, Jun. 2012, pp. 1660-1667.
Ozevin et al., "Novel Leak Localization in Pressurized Pipeline Networks using Acoustic Emission and Geometric Connectivity", International Journal of Pressure Vessels and Piping, vol. 92, Apr. 2012, pp. 1-12.
Perez et al., "Leak Localization in Water Networks: A Model-Based Methodology Using Pressure Sensors Applied to a Real Network in Barcelona", IEEE Control Systems Magazine, Aug. 2014, pp. 1-13.
Sethaputra et al., "Experiences Using Water Network Analysis Modeling for Leak Localization", Proc., 5th IWA Water Loss Reduction Specialist Conf., 2009, pp. 1-10.
Tian et al., "Negative Pressure Wave based Pipeline Leak Detection: Challenges and Algorithms", Service Operations and Logistics, and Informatics (SOLI), 2012 IEEE International Conference on. IEEE, 2012, pp. 1-5.
List of IBM Patents or Patent Applications Treated as Related; (Appendix P), Filed Jan. 28, 2016; 2 pages.
Harsh Chaudhary et al., "Temporal Delay Determination for Calibration of Distributed Sensors in a Mass Transport Network", U.S. Appl. No. 15/009,262, filed Jan. 28, 2016.
Harsh Chaudhary et al., "Network Graph Representation of Physically Connected Network", U.S. Appl. No. 15/009,291, filed Jan. 28, 2016.
Harsh Chaudhary et al., "Leak Identification in a Mass Transport Network", U.S. Appl. No. 15/009,340, filed Jan. 28, 2016.
Harsh Chaudhary et al., "Forecasting Leaks in Pipeline Network", U.S. Appl. No. 14/976,903, filed Dec. 21, 2015.

\* cited by examiner

LEAK LOCALIZATION IN PIPELINE NETWORK

BACKGROUND

The present invention relates to a pipeline network, and more specifically, to leak localization in a pipeline network.

Pipeline networks that transport water, natural gas, or other resources can traverse hundreds of miles at or above the surface. Sensors and other equipment may be located at regular or irregular intervals of the network (e.g., every 30-100 miles). In the exemplary case of a gas pipeline, the sensors may include a pressure sensor, and the equipment may include a compression station that increases pressure to push the gas along the pipeline (toward the next compression station). In the exemplary case of a water pipeline, the sensors may measure flow rate. Exemplary pipeline systems may also involve the injection of an acoustic signal and acoustic sensors. The equipment associated with a pipeline would additionally include communication equipment to transmit the sensor information. A supervisory control and data acquisition (SCADA) system obtains data from and provides control to the remote sensors and equipment.

SUMMARY

Embodiments include a method, system, and computer program product for localizing a leak in a pipeline network. Aspects include identifying a respective measured time at which an effect of a leak exhibits in a time-varying data signal measured by each of a plurality of sensors distributed along the pipeline network, each pair of the plurality of sensors defining a respective pipe segment therebetween; estimating, using a processor a time of occurrence of the leak based on the measured time associated with two or more of the plurality of sensors; estimating a relative distance of a leak location from one or more of the plurality of sensors; and determining the leak location based on the relative distance.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, a pipeline network may be used to transport resources such as natural gas or water over long distances. A SCADA system receives information from and provides commands to sensors and other equipment distributed along the pipeline network. The physical and logical connections among the measurement points (sensors) within the pipeline network may be known. That is, the geopositions of the sensors, as well as the interconnections among the sensors may be the network may be known. In addition, leak identification may be part of the SCADA system functionality. That is, the fact that there is a leak within the pipeline network may be known. Embodiments of the systems and methods detailed herein relate to localizing the leak such that mitigation and repair efforts may be undertaken efficiently.

Figure 1:
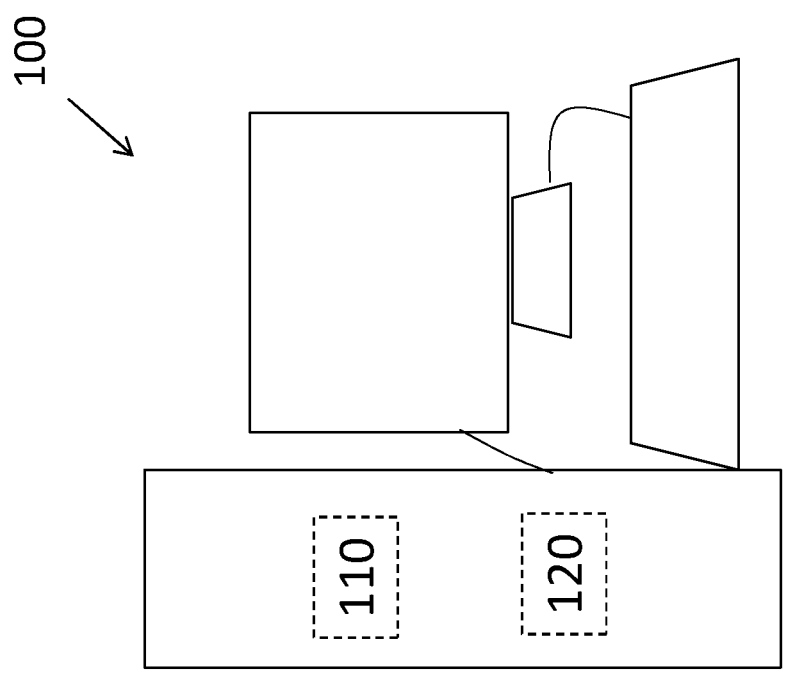
FIG. 1 is a block diagram of a system that localizes a leak within the pipeline network according to embodiments of the invention.
Figure 1:
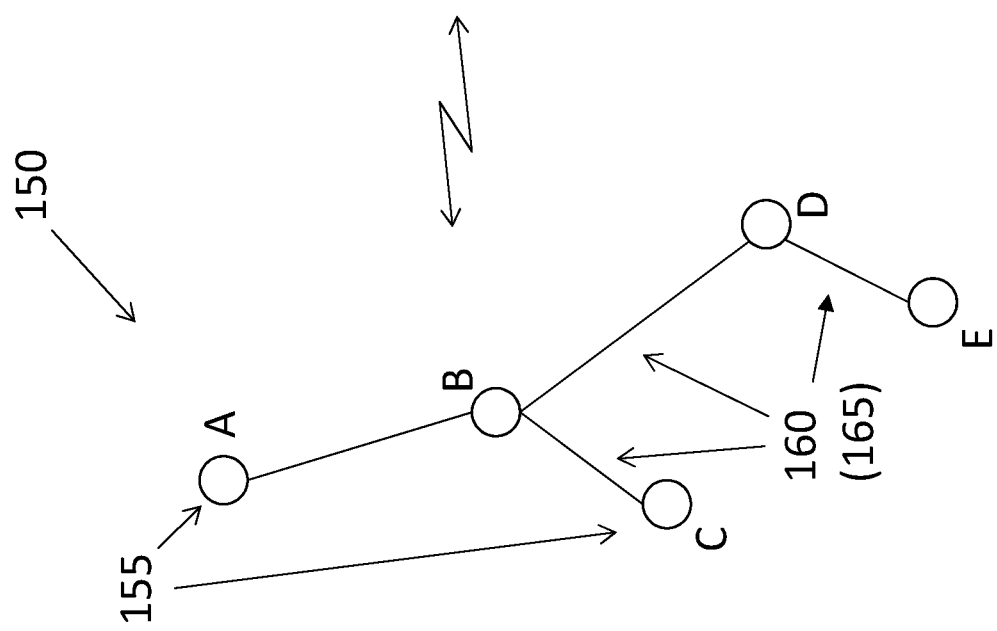

FIG. 1 is a block diagram of a system 100 that localizes a leak within the pipeline network 150 according to embodiments of the invention. The system 100 may also serve the SCADA function or may be separate from the SCADA system that controls the pipeline network 150. The pipeline network 150 (e.g., gas pipeline, water pipeline) includes sensors 155 at known locations based on geopositioning. The pipeline network 150 also includes interconnections 160 among the sensors 155. The exemplary pipeline network 150 in FIG. 1 includes exemplary sensors 155 A, B, C, D, and E. The system 100 includes one or more memory devices 110 and one or more processors 120. The system 100 includes additional known components that perform functions such as, for example, communication with the sensors 155 of the pipeline network 150. The memory device 110 stores instructions implemented by the processor 120 to localize a leak. According to the embodiments detailed below, the memory device 110 may additionally store information indicating the geopositions of the sensors 155 and a representation of the interconnections among the sensors 155. The interconnections 160 between sensor 155 locations are pipe segments 165 that make up the full pipeline network 150. That is, a pipe segment is defined by the two sensors 155 on either end (e.g., the interconnection 160 between sensor 155 B and sensor 155 D is a pipe segment 165). The localization of a leak, according to embodiments herein, refers to determining not only a particular pipe segment 165 in which the leak occurs but also the relative distance from each of the two sensors 155 defining the pipe segment 165. Based on this localization, repairs or other mitigating actions may be undertaken to manage the pipeline network 150.

Three scenarios are discussed herein. The first two are unlikely but provide explanatory building blocks for the localization of leaks in the third scenario according to embodiments. In the first scenario, it is assumed that the flow of the resource (e.g., gas, water) is not affected by the particular pipe segment 165 or by the direction of flow (i.e., flow is segment and direction invariant). That is, delay associated with flow from sensor 155 A to sensor 155 B ($d_{A,B}$) is the same as delay associated with flow from sensor 155 B to sensor 155 A ($d_{B,A}$), where sensors 155 A and B refer to any two successive sensors 155 in the pipeline network 150 that define (bound) a pipe segment 165. In the second scenario, flow is assumed to be segment invariant but direction dependent. Thus, for any pipe segment 165 defined by any two successive sensors 155 A and B, $d_{A,B} \neq d_{B,A}$. In the third scenario, flow is both segment and direction dependent. This is most likely in a given pipeline network 150. Delay may be designated as $d_{A,B,k}$, where A and B indicate the sensors 155 defining the pipe segment 165 and the flow direction (A,B indicating A→B and B,A indicating B→A) and k indicates the segment number.

Figure 2:
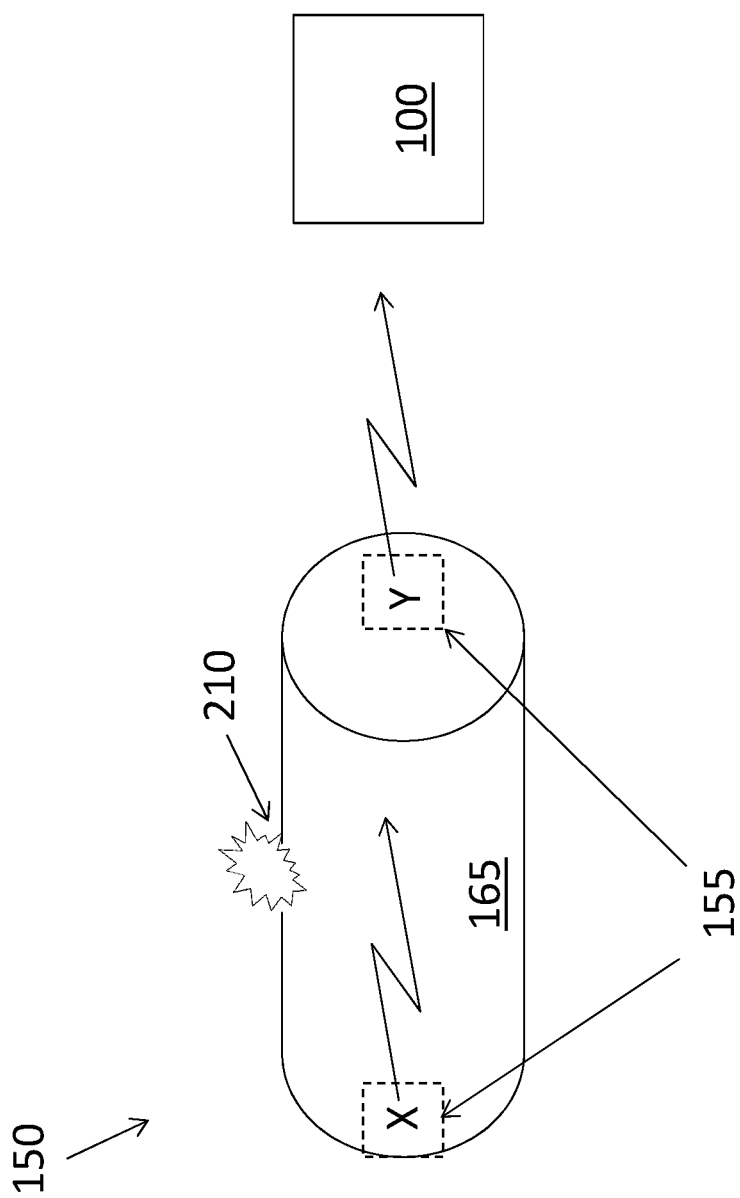
FIG. 2 illustrates a pipe segment with a leak location identified according to embodiments detailed below.

FIG. 2 illustrates a pipe segment 165 with a leak location 210 identified according to embodiments detailed below. The pipe segment 165 shown in FIG. 2 is defined by sensors 155 X and Y. As noted above, the geoposition of each of the sensors 155 X and Y is known. The embodiments detailed herein provide a relative distance to the leak location 210 from each of the sensors 155 X and Y. Thus, the leak location 210 may be obtained from the geoposition of the sensors 155 and the relative distance according to known techniques.

Each of the sensors 155 X and Y transmits measured time-varying data (e.g., pressure, flow rate, acoustic signal) to the system 100, as indicated. The system 100 may or may not be the SCADA system that controls the pipeline network 150.

Figure 3:
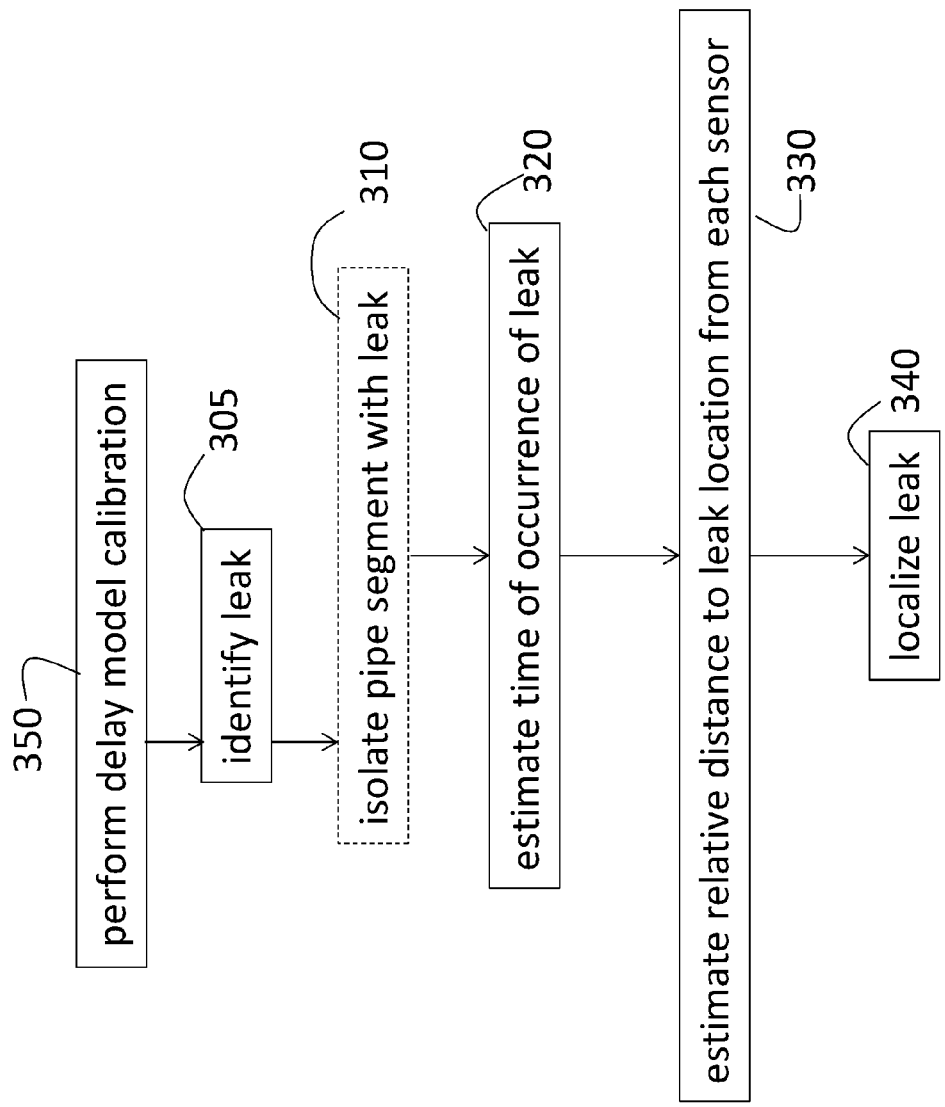
FIG. 3 is a process flow of a method of localizing a leak in a pipeline network according to embodiments.

FIG. 3 is a process flow of a method of localizing a leak in a pipeline network 150 according to embodiments. Localizing a leak in the pipeline network 150 refers to determining the leak location 210 within the pipe segment 165. As noted above, depending on the specific type of pipeline network 150 (e.g., gas pipeline, water pipeline), the time-varying data measured by the sensors 155 may be pressure, flow rate, or acoustic signal, for example. When a leak occurs, a discernable disruption in the data (e.g., pressure change) being measured by the sensors 155 occurs at some time after the time of occurrence of the leak. Also, the disruption occurs at each of the two sensors 155 that define the (leaky) pipe segment 165 at a time commensurate with the relative position of the leak within the pipe segment 165. That is, when the leak location 210 is closer to one end of the pipe segment 165 (e.g., leak location 210 is closer to sensor 155 X than to sensor 155 Y), then the disruption in the data measured by the sensor 155 X will manifest prior to the disruption in data measured by sensor 155 Y. When the leak location 210 is equidistant to each of the sensors 155 X and Y, then the disruption in the time-varying data measurement at each sensor 155 X and Y will occur at the same time. This time difference (or equality) is the basis for determining the relative position of the leak within a segment 165, as detailed below. The processes are first detailed below assuming the first scenario (flow is segment and direction invariant) for explanatory purposes. Variations in the processes for the second and third scenario are then discussed. The process at block 350 is only performed for the third scenario, as further discussed below.

At block 305, identifying a leak is done according to known methods. For example, time-window spectral analysis may be performed on the time-varying data signal measured by each sensor 155 to identify the disruption or disturbance in the steady state spectrum. In the exemplary case of a gas pipeline, a compression station may increase pressure at one or more points along the pipeline network 150 to aid in the transport of the gas. Thus, the spectral analysis must distinguish the pressure increase from a pressure drop that would result from a leak based on a threshold, for example. Time-window histogram analysis of a fast Fourier transform (FFT), wavelet, or other domain transformation may be performed on the time-varying data to identify the leak instead. As part of this process, the time ($t_i$) at which the disruption in the data is detected at each given sensor 155 $i$ is recorded.

At block 310, isolating the pipe segment 165 with a leak may involve a process of elimination. The process of elimination is based on the fact that the sum of the time difference between the leak occurring and a data disruption caused by the leak being recorded (based on a disruption in the data measured) at each of the sensors 155 defining the pipe segment 165 must total the time for the data to traverse the length of the pipe segment 165 when the leak is within that pipe segment 165. Put another way, if the following equation holds true for a given pipe segment 165, then the pipe segment 165 does not include the leak:

$$|t_X - t_Y| \approx T_{X,Y} \qquad [EQ. 1]$$

In EQ. 1, $t_X$ and $t_Y$ are times at which the disturbance in the time-varying data is recorded at the sensor 155 X and the sensor 155 Y, respectively, and $T_{X,Y}$ is the total time from sensor 155 X to sensor 155 Y. Specifically, $T_{X,Y}$ is the total time it would take for the disturbance or change in the data (e.g., pressure, flow rate) being recorded by the sensors 155 to travel from one end of the pipe segment 165 to the other. Every pipe segment 165 in the pipeline network 150 may not be the same length such that $T_{first,second}$ may be different for each pair of first and second sensors 155. The pipe segment 165 length may be determined based on the geopositions of the sensors 155 that define the pipe length 165. The approximation ($\approx$) sign in EQ. 1 is an equal sign (=) for the first scenario because flow is direction invariant (flow from the leak to sensor 155 X and flow from the leak to sensor 155 Y are not different based on direction). However, flow is direction dependent for the second and third scenarios. Thus, the pipe segment 165 does not include the leak if EQ. 1 is approximately true (i.e., the pipe segment 165 for which EQ. 1 is the least true is the one with the leak). This process is not performed separately for the third scenario. Instead, determining the pipe segment 165 with the leak (at block 310) is combined with the processes at blocks 320 and 330, as detailed below.

At block 320, estimating the time of occurrence of the leak, t, involves the following equation for the first scenario (when flow is segment and direction invariant):

$$(t_X - t) + (t_Y - t) \approx T_{X,Y} \qquad [EQ. 2]$$

That is, the total time ($T_{X,Y}$) through the pipe segment 165 defined by sensor 155 X and sensor 155 Y is used along with the time at which each of the sensors 155 X and Y detected the leak as a disturbance in the measured data ($t_X$ and $t_Y$) to estimate the time of occurrence of the leak (t). The total time $T_{X,Y}$ is determined based on the length of the pipe segment 165 and the diameter of the pipe segment 165 (assuming a uniform diameter). Estimating the time of occurrence of the leak for the second and third scenarios is discussed below. Estimating the relative distance to the leak location 210 from each sensor 155 X and Y that defines the pipe segment 165 with the leak, at block 330, involves respectively using EQ. 3 and EQ. 4 below for the first scenario:

$$(t_X - t)/T_{X,Y} \qquad [EQ. 3]$$

$$(t_Y - t)/T_{X,Y} \qquad [EQ. 4]$$

EQ. 3 provides an estimate of the relative distance from sensor 155 X to the leak location 210, and EQ. 4 provides an estimate of the relative distance from sensor 155 Y to the leak location 210. Estimating the relative distance to the leak location 210 for the second and third scenarios is discussed below. Localizing the leak, at block 340, refers to determining the leak location 210 on the pipe segment 165 based on relative distance and applies to all three scenarios. Localizing the leak involves the length ($L_{X,Y}$) of the pipe segment 165 defined by sensor 155 X and sensor 155 Y according to the following:

$$L_{X,Y}(t_X - t)/T_{X,Y} \qquad [EQ. 5]$$

Based on the known geoposition of the sensors 155 X and Y, the geolocation of the leak location 210 may be determined, as well.

For the second scenario (when flow is segment invariant but direction dependent), the processing at blocks 320 and 330 differs from the discussion above with regard to the first scenario. This is because the assumption that forms the basis of EQ. 2 does not hold when flow is direction dependent. Instead, both the time of occurrence of the leak and the relative distance of the leak from sensor 155 X are determined by determining the minimum relative distance to the leak along the pipe segment 165 (p) and time of occurrence of the leak (t) that satisfy:

$$|d_{X,Y}(p)+d_{X,Y}(p)-(t_X-t)-(t_Y-t)|_1 \quad \text{[EQ. 6]}$$

In EQ. 6, $d_{X,Y}(p)$ is the delay from the sensor 155 X to the leak location 210 in the direction from sensor 155 X to sensor 155 Y, and $d_{Y,X}(p)$ is the delay from the sensor 155 Y to the leak location 210 in the direction from the sensor 155 Y to sensor 155 X. As a comparison of EQ. 2 with EQ. 6 indicates, the delays ($d_{X,Y}(p)$ and $d_{Y,X}(p)$) add up to total time total time ($T_{X,Y}$) through the pipe segment 165 defined by sensor 155 X and sensor 155 Y in the ideal case (the first scenario) because pipe diameter is assumed to be constant in the first scenario. In minimizing p and t to satisfy EQ. 6, the following constraints must also be met:

$$0 \leq p \leq L_{X,Y} \quad \text{[EQ. 7]}$$

EQ. 7 indicates that the relative distance to the leak must be less than the length of the pipe segment 165. This would have to be true if the leak is within the pipe segment 165. And:

$$t \leq \min(t_X, t_Y) \quad \text{[EQ. 8]}$$

EQ. 8 indicates that the time of occurrence of the leak must precede the time that the disruption in the data caused by the leak reaches either of the sensors 155 X and Y. This would also have to be true if the leak is within the pipe segment 165 defined by sensors 155 X and Y. At this point, localizing the leak, at block 340, could proceed for the second scenario, using EQ. 5.

For the third scenario (when flow is both segment and direction dependent), the processing at blocks 320 and 330 differs from the discussion above with regard to both the first and second scenarios. Also, as noted above, the process at block 310 is not performed as described above but is, instead, part of the estimations at blocks 320 and 330. For the third scenario, performing a delay model calibration, at block 350, precedes the other processing that is performed following a leak. The delay model calibration (at block 250) is performed based on observation of the pipeline network 150 during normal operation (without any leaks). The observation over time generally detects flow in both directions of each pipe segment 165 of the pipeline network 150. The delay value d is given by:

$$d_{k,i,j}=D_{k,i,j}F_{k,i,j} \quad \text{[EQ. 9]}$$

In EQ. 9, $D_{k,i,j}$ is a diameter change in the k-th pipe segment 165 in the direction from sensor 155 i to sensor 155 j, and $F_{k,i,j}$ is the friction factor in the k-th pipe segment 165 in the direction from sensor 155 i to sensor 155 j. Thus, the delay d may be estimated by determining minimum friction F values that satisfy the following expression:

$$|\Sigma_{k=1}^{K} d_{k,i,j} - \hat{d}_{forward}|_1 + |\Sigma_{k=1}^{K} d_{k,j,i} - \hat{d}_{backward}|_1 \quad \text{[EQ. 10]}$$

In EQ. 10, k is the pipe segment 165 index, K is the number of pipe segments 165, and i and j designate the two sensors 155 that define the pipe segment 165. Also, $\hat{d}$ is delay (in the forward or backward direction in the pipe segment 165) during normal operation that is estimated based on observation. In the exemplary pipe segment 165 shown in FIG. 2, i and j are X and Y, respectively. The friction factor for any given pipe segment 165 in any given direction (e.g., $F_{k,i,j}$) cannot exceed a maximum friction factor for the pipeline network 150.

After the calibration process for the third (realistic) scenario, the minimum values of the pipe segment 165 including the leak (N), the relative distance to the leak along that pipe segment 165 (p), and the time of occurrence of the leak (t) that satisfy the following are solved:

$$|\Sigma_{k=0}^{N-1} d_{k,i,j} + d_{N,i,j}(p) + d_{N,j,i}(p) + \Sigma_{k=N+1}^{K} d_{k,j,i} - (t_i-t) - (t_j-t)|_1 \quad \text{[EQ. 11]}$$

EQs. 7, 8, and 10, above, apply, as well, to EQ. 11. The value of N (the pipe segment 165 with the leak) is changed iteratively (e.g., N=1, N=2, . . . , N=K) to determine the minimum N value for which relative distance p and time of occurrence t are minimized. As EQ. 11 indicates, when N=0, the sum (of $d_{k,i,j}$) is from k-0 to -1 and is just not done. Once these values are estimated, the localization of the leak, at block 340, may be performed as discussed above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of localizing a leak in a pipeline network, the method comprising:
   identifying a respective measured time at which an effect of a leak exhibits in a time-varying data signal measured by each of a plurality of sensors distributed along the pipeline network, each adjacent pair of the plurality of sensors defining a respective pipe segment therebetween;

estimating, using a processor, a time of occurrence of the leak based on the measured time associated with two or more of the plurality of sensors;

estimating, using the processor, a relative distance of a leak location from one or more of the plurality of sensors;

determining, using the processor, the leak location based on the relative distance; and performing a delay model calibration during normal operation without the leak in the pipeline network, the delay model calibration determining propagation delay d of the time-varying data signal in both directions through each of the pipe segments of the pipeline network.

2. The computer-implemented method according to claim 1, wherein the propagation delay d for each respective pipe segment k defined by each of the pair of the plurality of sensors i and j is given by:

$d_{k,i,j} = D_{k,i,j} F_{k,i,j}$, where

D is a diameter change and F is a friction factor in the pipe segment k in the direction from one of the pair of the plurality of sensors i to another of the pair of the plurality of sensors j.

3. The computer-implemented method according to claim 2, wherein the performing the delay model calibration includes estimating the propagation delay d in each direction by determining corresponding minimum values of the friction factor F that satisfy an expression:

$$\left| \sum_{k=1}^{K} d_{k,i,j} - \hat{d}_{forward} \right|_1 + \left| \sum_{k=1}^{K} d_{k,j,i} - \hat{d}_{backward} \right|_1 ,$$

where $\hat{d}_{forward}$ and $\hat{d}_{backward}$ are the observed delays in each of the two directions through the pipe segment.

4. The computer-implemented method according to claim 1, wherein the estimating the time of occurrence t of the leak and the estimating the relative distance p of the leak location from each of the pair of the plurality of sensors is accomplished by performing an iterative operation, each iteration considering a different pipe segment corresponding to each of the pairs of the plurality of sensors as the pipe segment N that includes the leak.

5. The computer-implemented method according to claim 4, wherein the performing the iterative operation includes determining a minimum value for each of N, t, and p that satisfy:

$$\left| \sum_{k=1}^{N-1} d_{k,i,j} + d_{N,i,j}(p) + d_{N,j,i}(p) + \sum_{k=N+1}^{K} d_{k,j,i} - (t_i - t) - (t_j - t) \right|_1 ,$$

where k is a pipe segment index, $d_{k,i,j}$ is the propagation delay from one of the pair of the plurality of sensors i to another of the plurality of sensors j, $d_{N,i,j}(p)$ is the propagation delay over the relative distance p in a direction from the one of the pair of the plurality of sensors i to the other of the plurality of sensors j, and ti and tj are the measured time at the one of the pair of the plurality of sensors i and the other of the plurality of sensors j, respectively.

6. The computer-implemented method according to claim 1, wherein the determining the leak location includes determining a position of the leak based on a geoposition of each of the pair of the plurality of sensors that define the pipe segment with the leak.

7. A system to localize a leak in a pipeline network, the system comprising:

a memory device configured to store a geoposition of each of a plurality of sensors distributed along the pipeline network, each adjacent pair of the plurality of sensors defining a respective pipe segment therebetween; and a processor configured to identify a respective measured time at which an effect of a leak exhibits in a time-varying data signal measured by each of the plurality of sensors, estimate a time of occurrence of the leak based on the measured time associated with two or more of the plurality of sensors, estimate a relative distance of a leak location from one or more of the plurality of sensors, and determine the leak location based on the relative distance, wherein the processor further performs a delay model calibration during normal operation without the leak in the pipeline network to determine propagation delay d of the time-varying data signal in both directions through each of the pipe segments of the pipeline network.

8. The system according to claim 7, wherein the processor determines the propagation delay d for each respective pipe segment k defined by each of the pair of the plurality of sensors i and j based on:

$d_{k,i,j} = D_{k,i,j} F_{k,i,j}$, where

D is a diameter change and F is a friction factor in the pipe segment k in the direction from one of the pair of the plurality of sensors i to another of the pair of the plurality of sensors j.

9. The system according to claim 8, wherein the processor performs the delay model calibration to estimate the propagation delay d in each direction by determining corresponding minimum values of the friction factor F that satisfy an expression:

$$\left| \sum_{k=1}^{K} d_{k,i,j} - \hat{d}_{forward} \right|_1 + \left| \sum_{k=1}^{K} d_{k,j,i} - \hat{d}_{backward} \right|_1 ,$$

where $\hat{d}_{forward}$ and $\hat{d}_{backward}$ are the observed delays in each of the two directions through the pipe segment.

10. The system according to claim 7, wherein the processor estimates the time of occurrence t of the leak and the relative distance p of the leak location from each of the pair of the plurality of sensors by performing an iterative operation, each iteration considering a different pipe segment corresponding to each of the pairs of the plurality of sensors as the pipe segment N that includes the leak.

11. The system according to claim 10, wherein the processor performs the iterative operation by determining minimum values for each of N, t, and p that satisfy:

$$\left| \sum_{k=1}^{N-1} d_{k,i,j} + d_{N,i,j}(p) + d_{N,j,i}(p) + \sum_{k=N+1}^{K} d_{k,j,i} - (t_i - t) - (t_j - t) \right|_1 ,$$

where
k is a pipe segment index, $d_{k,i,j}$ is the propagation delay from one of the pair of the plurality of sensors i to another of the plurality of sensors j, $d_{N,i,j}(p)$ is the propagation delay over the relative distance p in a direction from the one of the pair of the plurality of sensors i to the other of the plurality of sensors j, and ti and tj are the measured time at the one of the pair of the plurality of sensors i and the other of the plurality of sensors j, respectively.

12. The system according to claim 7, wherein the processor determines the leak location based on the geoposition of each of the pair of the plurality of sensors that define the pipe segment with the leak and the relative distance of the leak location from each of the pair of the plurality of sensors that define the pipe segment with the leak.

13. A computer program product for localizing a leak in a pipeline network, the computer program product comprising a computer readable storage medium having program instructions embodied therewith, the program instructions executable by a processor to perform a method comprising:
identifying a respective measured time at which an effect of a leak exhibits in a time-varying data signal measured by each of a plurality of sensors distributed along the pipeline network, each adjacent pair of the plurality of sensors defining a respective pipe segment therebetween;
estimating a time of occurrence of the leak based on the measured time associated with two or more of the plurality of sensors;
estimating a relative distance of a leak location from one or more of the plurality of sensors; and
determining the leak location based on the relative distance; and
performing a delay model calibration during normal operation without the leak in the pipeline network, the delay model calibration determining propagation delay d of the time-varying data signal in both directions through each of the pipe segments of the pipeline network.

14. The computer program product according to claim 13, wherein the propagation delay d for each respective pipe segment k defined by each of the pair of the plurality of sensors i and j is given by:

$d_{k,i,j} = D_{k,i,j} F_{k,i,j}$, where

D is a diameter change and F is a friction factor in the pipe segment k in the direction from one of the pair of the plurality of sensors i to another of the pair of the plurality of sensors j.

15. The computer program product according to claim 14, wherein the performing the delay model calibration includes estimating the propagation delay d in each direction by determining corresponding minimum values of the friction factor F that satisfy an expression:

$$\left| \sum_{k=1}^{K} d_{k,i,j} - \hat{d}_{forward} \right|_1 + \left| \sum_{k=1}^{K} d_{k,j,i} - \hat{d}_{backward} \right|_1,$$

where
$\hat{d}_{forward}$ and $\hat{d}_{backward}$ are the observed delays in each of the two directions through the pipe segment.

16. The computer program product according to claim 13, wherein the estimating the time of occurrence t of the leak and the estimating the relative distance p of the leak location from each of the pair of the plurality of sensors is accomplished by performing an iterative operation, each iteration considering a different pipe segment corresponding to each of the pairs of the plurality of sensors as the pipe segment N that includes the leak.

17. The computer program product according to claim 16, wherein the performing the iterative operation includes determining a minimum value for each of N, t, and p that satisfy:

$$\left| \sum_{k=1}^{N-1} d_{k,i,j} + d_{N,i,j}(p) + d_{N,j,i}(p) + \sum_{k=N+1}^{K} d_{k,j,i} - (t_i - t) - (t_j - t) \right|_1,$$

where
k is a pipe segment index, $d_{k,i,j}$ is the propagation delay from one of the pair of the plurality of sensors i to another of the plurality of sensors j, $d_{N,i,j}(p)$ is the propagation delay over the relative distance p in a direction from the one of the pair of the plurality of sensors i to the other of the plurality of sensors j, and ti and tj are the measured time at the one of the pair of the plurality of sensors i and the other of the plurality of sensors j, respectively.

* * * * *